(12) United States Patent
Barrick et al.

(10) Patent No.: US 10,884,752 B2
(45) Date of Patent: Jan. 5, 2021

(54) SLICE-BASED ALLOCATION HISTORY BUFFER

(71) Applicant: International Business Machines Corporation, Armonk, NY (US)

(72) Inventors: Brian D. Barrick, Pflugerville, TX (US); Gregory W. Alexander, Pflugerville, TX (US); Dung Q. Nguyen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 15/825,164

(22) Filed: Nov. 29, 2017

(65) Prior Publication Data
US 2019/0163480 A1  May 30, 2019

(51) Int. Cl.
*G06F 9/30* (2018.01)
*G06F 9/38* (2018.01)

(52) U.S. Cl.
CPC ........ *G06F 9/3832* (2013.01); *G06F 9/30109* (2013.01); *G06F 9/384* (2013.01); *G06F 9/3855* (2013.01); *G06F 9/3857* (2013.01)

(58) Field of Classification Search
None
See application file for complete search history.

(56) References Cited

U.S. PATENT DOCUMENTS

| 5,519,841 A * | 5/1996 | Sager ................. G06F 9/32 711/202 |
| 9,256,433 B2 | 2/2016 | Anderson |
| 9,514,051 B2 | 12/2016 | Zhao et al. |
| 10,007,521 B1 * | 6/2018 | Tam ................. G06F 9/384 |
| 2010/0274961 A1 * | 10/2010 | Golla ............... G06F 9/384 711/108 |
| 2010/0274993 A1 * | 10/2010 | Golla ............ G06F 9/30109 712/216 |
| 2016/0092276 A1 | 3/2016 | Chu et al. |
| 2016/0202992 A1 | 7/2016 | Brownscheidle et al. |
| 2016/0283236 A1 | 9/2016 | Genden et al. |
| 2016/0328330 A1 | 11/2016 | Ayub et al. |
| 2016/0350114 A1 * | 12/2016 | Airaud .............. G06F 9/384 |
| 2017/0109093 A1 | 4/2017 | Chu et al. |
| 2017/0109166 A1 * | 4/2017 | Eisen ............ G06F 9/30072 |
| 2017/0109167 A1 | 4/2017 | Eisen et al. |
| 2017/0109171 A1 | 4/2017 | Eisen et al. |
| 2018/0188997 A1 | 7/2018 | Fleming, Jr. et al. |
| 2019/0004970 A1 | 1/2019 | Pham et al. |

* cited by examiner

*Primary Examiner* — Corey S Faherty
(74) *Attorney, Agent, or Firm* — Nathan M. Rau

(57) ABSTRACT

A multi-slice processor comprising a high-level structure and history buffer. Write backs are no longer associated with the history buffer and the history buffer comprises slices determined by logical register allocation. The history buffer receives a register pointer entry and either releases or restores the entry with functional units comprised in the history buffer.

20 Claims, 20 Drawing Sheets

| LREG  | RTAG |
|-------|------|
| GPR0  | 0    |
| GPR4  | 1    |
| GPR8  | 2    |
| GPR12 | 3    |
| GPR16 | 4    |
| GPR20 | 5    |
| GPR24 | 6    |
| GPR28 | 7    |

FIG. 8A

| ITAG | LREG WRT | NEW RTAG |
|------|----------|----------|
| 0    | GPR0     | 8        |
| 1    | GPR4     | 9        |
| 2    | GPR0     | 10       |
| 3    | GPR8     | 11       |
| 4    | GPR12    | 12       |
| 5    | GPR20    | 13       |
| 6    | GPR12    | 14       |
| 7    | GPR0     | 15       |
| 8    | GPR24    | 16       |
| 9    | GPR20    | 17       |
| 10   | GPR0     | 18       |
| 11   | GPR4     | 19       |
| 12   | GPR12    | 20       |
| 13   | GPR28    | 21       |

FIG. 8B

| LREG | ITAGs Writing | RTAG progression |
|---|---|---|
| GPR0 | 0,2,7,10 | 0 -> 8 -> 10 -> 15 -> 18 |
| GPR4 | 1,11 | 1 -> 9 -> 19 |
| GPR8 | 3 | 2 -> 11 |
| GPR12 | 4,6,12 | 3 -> 12 -> 20 |
| GPR16 | NONE | 4 |
| GPR20 | 5,9 | 5 -> 13 -> 17 |
| GPR24 | 8 | 6 -> 16 |
| GPR28 | 13 | 7 -> 21 |

FIG. 8C

Grouping0

| Entry | LREG | Evictor ITAG | Evictor RTAG | RTAG |
|---|---|---|---|---|
| 0 | GPR0 | 0 | 8 | 0 |
| 1 | -- | - | - | - |
| 2 | -- | - | - | - |
| 3 | -- | - | - | - |
| 4 | -- | - | - | - |
| 5 | -- | - | - | - |
| 6 | -- | - | - | - |
| 7 | -- | - | - | - |

Grouping1

| Entry | LREG | Evictor ITAG | Evictor RTAG | RTAG |
|---|---|---|---|---|
| 0 | -- | - | - | - |
| 1 | -- | - | - | - |
| 2 | -- | - | - | - |
| 3 | -- | - | - | - |
| 4 | -- | - | - | - |
| 5 | -- | - | - | - |
| 6 | -- | - | - | - |
| 7 | -- | - | - | - |

...

| |
|---|
| Group0 -> -1111111 |
| Group1 -> -------- |
| Group2 -> -------- |
| Group3 -> -------- |
| Group4 -> -------- |
| Group5 -> -------- |
| Group6 -> -------- |
| Group7 -> -------- |

Age Array

FIG. 8D

| Grouping0 | | | | | Grouping1 | | | | |
|---|---|---|---|---|---|---|---|---|---|
| Entry | LREG | Evictor ITAG | Evictor RTAG | RTAG | Entry | LREG | Evictor ITAG | Evictor RTAG | RTAG |
| 0 | GPR0 | 0 | 8 | 0 | 0 | -- | - | - | - |
| 1 | GPR4 | 1 | 9 | 1 | 1 | -- | - | - | - |
| 2 | GPR0 | 2 | 10 | 8 | 2 | -- | - | - | - |
| 3 | GPR8 | 3 | 11 | 2 | 3 | -- | - | - | - |
| 4 | GPR12 | 4 | 12 | 3 | 4 | -- | - | - | - |
| 5 | GPR20 | 5 | 13 | 5 | 5 | -- | - | - | - |
| 6 | GPR12 | 6 | 14 | 12 | 6 | -- | - | - | - |
| 7 | GPR0 | 7 | 15 | 10 | 7 | -- | - | - | - |

...

Age Array

| Group0 -> -1111111 |
|---|
| Group1 -> - - - - - - - - |
| Group2 -> - - - - - - - - |
| Group3 -> - - - - - - - - |
| Group4 -> - - - - - - - - |
| Group5 -> - - - - - - - - |
| Group6 -> - - - - - - - - |
| Group7 -> - - - - - - - - |

FIG. 8E

Grouping0

| Entry | LREG | Evictor ITAG | Evictor RTAG | RTAG |
|---|---|---|---|---|
| 0 | GPR0 | 0 | 8 | 0 |
| 1 | GPR4 | 1 | 9 | 1 |
| 2 | GPR0 | 2 | 10 | 8 |
| 3 | GPR8 | 3 | 11 | 2 |
| 4 | GPR12 | 4 | 12 | 3 |
| 5 | GPR20 | 5 | 13 | 5 |
| 6 | GPR12 | 6 | 14 | 12 |
| 7 | GPR0 | 7 | 15 | 10 |

Grouping1

| Entry | LREG | Evictor ITAG | Evictor RTAG | RTAG |
|---|---|---|---|---|
| 0 | GPR24 | 8 | 16 | 6 |
| 1 | -- | - | - | - |
| 2 | -- | - | - | - |
| 3 | -- | - | - | - |
| 4 | -- | - | - | - |
| 5 | -- | - | - | - |
| 6 | -- | - | - | - |
| 7 | -- | - | - | - |

...

Age Array

| |
|---|
| Group0 -> -0111111 |
| Group1 -> 1-111111 |
| Group2 -> -------- |
| Group3 -> -------- |
| Group4 -> -------- |
| Group5 -> -------- |
| Group6 -> -------- |
| Group7 -> -------- |

FIG. 8F

Grouping0

| Entry | LREG | Evictor ITAG | Evictor RTAG | RTAG |
|---|---|---|---|---|
| 0 | GPR0 | 0 | 8 | 0 |
| 1 | GPR4 | 1 | 9 | 1 |
| 2 | GPR0 | 2 | 10 | 8 |
| 3 | GPR8 | 3 | 11 | 2 |
| 4 | GPR12 | 4 | 12 | 3 |
| 5 | GPR20 | 5 | 13 | 5 |
| 6 | GPR12 | 6 | 14 | 12 |
| 7 | GPR0 | 7 | 15 | 10 |

Grouping1

| Entry | LREG | Evictor ITAG | Evictor RTAG | RTAG |
|---|---|---|---|---|
| 0 | GPR24 | 8 | 16 | 6 |
| 1 | GPR20 | 9 | 17 | 13 |
| 2 | GPR0 | 10 | 18 | 15 |
| 3 | GPR4 | 11 | 19 | 9 |
| 4 | GPR12 | 12 | 20 | 14 |
| 5 | GPR28 | 13 | 21 | 7 |
| 6 | -- | - | - | - |
| 7 | -- | - | - | - |

...

Age Array

| |
|---|
| Group0 -> -0111111 |
| Group1 -> 1-111111 |
| Group2 -> -------- |
| Group3 -> -------- |
| Group4 -> -------- |
| Group5 -> -------- |
| Group6 -> -------- |
| Group7 -> -------- |

FIG. 8G

Grouping0

| Entry | LREG | Evictor ITAG | Evictor RTAG | RTAG |
|---|---|---|---|---|
| 0 | -- | - | - | - |
| 1 | -- | - | - | - |
| 2 | GPR0 | 2 | 10 | 8 |
| 3 | GPR8 | 3 | 11 | 2 |
| 4 | GPR12 | 4 | 12 | 3 |
| 5 | GPR20 | 5 | 13 | 5 |
| 6 | GPR12 | 6 | 14 | 12 |
| 7 | GPR0 | 7 | 15 | 10 |

Grouping1

| Entry | LREG | Evictor ITAG | Evictor RTAG | RTAG |
|---|---|---|---|---|
| 0 | GPR24 | 8 | 16 | 6 |
| 1 | GPR20 | 9 | 17 | 13 |
| 2 | GPR0 | 10 | 18 | 15 |
| 3 | GPR4 | 11 | 19 | 9 |
| 4 | GPR12 | 12 | 20 | 14 |
| 5 | GPR28 | 13 | 21 | 7 |
| 6 | -- | - | - | - |
| 7 | -- | - | - | - |

...

Age Array

| | |
|---|---|
| Group0 -> | -0111111 |
| Group1 -> | 1-111111 |
| Group2 -> | -------- |
| Group3 -> | -------- |
| Group4 -> | -------- |
| Group5 -> | -------- |
| Group6 -> | -------- |
| Group7 -> | -------- |

FIG. 8H

Grouping0

| Entry | LREG | Evictor ITAG | Evictor RTAG | RTAG |
|---|---|---|---|---|
| 0 | -- | - | - | - |
| 1 | -- | - | - | - |
| 2 | GPR0 | 2 | 10 | 8 |
| 3 | GPR8 | 3 | 11 | 2 |
| 4 | GPR12 | 4 | 12 | 3 |
| 5 | GPR20 | 5 | 13 | 5 |
| 6 | GPR12 | 6 | 14 | 12 |
| 7 | GPR0 | 7 | 15 | 10 |

Grouping1

| Entry | LREG | Evictor ITAG | Evictor RTAG | RTAG |
|---|---|---|---|---|
| 0 | GPR24 | 8 | 16 | 6 |
| 1 | GPR20 | 9 | 17 | 13 |
| 2 | GPR0 | 10 | 18 | 15 |
| 3 | GPR4 | 11 | 19 | 9 |
| 4 | GPR12 | 12 | 20 | 14 |
| 5 | GPR28 | 13 | 21 | 7 |
| 6 | -- | - | - | - |
| 7 | -- | - | - | - |

...

Age Array

| |
|---|
| Group0 -> -0111111 |
| Group1 -> 1-111111 |
| Group2 -> -------- |
| Group3 -> -------- |
| Group4 -> -------- |
| Group5 -> -------- |
| Group6 -> -------- |
| Group7 -> -------- |

FIG. 8I

| | | Grouping0 | | | | | Grouping1 | | |
|---|---|---|---|---|---|---|---|---|---|
| Entry | LREG | Evictor ITAG | Evictor RTAG | RTAG | Entry | LREG | Evictor ITAG | Evictor RTAG | RTAG |
| 0 | -- | - | - | - | 0 | GPR24 | 8 | 16 | 6 |
| 1 | -- | - | - | - | 1 | GPR20 | 9 | 17 | 13 |
| 2 | GPR0 | 2 | 10 | 8 | 2 | GPR0 | 10 | 18 | 15 |
| 3 | GPR8 | 3 | 11 | 2 | 3 | GPR4 | 11 | 19 | 9 |
| 4 | GPR12 | 4 | 12 | 3 | 4 | -- | - | - | - |
| 5 | GPR20 | 5 | 13 | 5 | 5 | GPR28 | 13 | 21 | 7 |
| 6 | -- | - | - | - | 6 | -- | - | - | - |
| 7 | -- | - | - | - | 7 | -- | - | - | - |

...

Age Array

| Group0 -> -0111111 |
|---|
| Group1 -> 1-111111 |
| Group2 -> -------- |
| Group3 -> -------- |
| Group4 -> -------- |
| Group5 -> -------- |
| Group6 -> -------- |
| Group7 -> -------- |

FIG. 8J

| | | Grouping0 | | | | | Grouping1 | | |
|---|---|---|---|---|---|---|---|---|---|
| Entry | LREG | Evictor ITAG | Evictor RTAG | RTAG | Entry | LREG | Evictor ITAG | Evictor RTAG | RTAG |
| 0 | -- | - | - | - | 0 | GPR24 | 8 | 16 | 6 |
| 1 | -- | - | - | - | 1 | GPR20 | 9 | 17 | 13 |
| 2 | GPR0 | 2 | 10 | 8 | 2 | GPR0 | 10 | 18 | 15 |
| 3 | GPR8 | 3 | 11 | 2 | 3 | GPR4 | 11 | 19 | 9 |
| 4 | GPR12 | 4 | 12 | 3 | 4 | -- | - | - | - |
| 5 | GPR20 | 5 | 13 | 5 | 5 | GPR28 | 13 | 21 | 7 |
| 6 | -- | - | - | - | 6 | -- | - | - | - |
| 7 | -- | - | - | - | 7 | -- | - | - | - |

...

Age Array

| |
|---|
| Group0 -> -0111111 |
| Group1 -> 1-111111 |
| Group2 -> -------- |
| Group3 -> -------- |
| Group4 -> -------- |
| Group5 -> -------- |
| Group6 -> -------- |
| Group7 -> -------- |

→ Restore RTAG 8 to GPR0
→ Restore RTAG 9 to GPR4
→ Restore RTAG 2 to GPR8
→ Restore RTAG 3 to GPR12

FIG. 8K

Grouping0

| Entry | LREG | Evictor ITAG | Evictor RTAG | RTAG |
|---|---|---|---|---|
| 0 | -- | - | - | - |
| 1 | -- | - | - | - |
| 2 | -- | - | - | - |
| 3 | -- | - | - | - |
| 4 | -- | - | - | - |
| 5 | GPR20 | 5 | 13 | 5 |
| 6 | -- | - | - | - |
| 7 | -- | - | - | - |

Grouping1

| Entry | LREG | Evictor ITAG | Evictor RTAG | RTAG |
|---|---|---|---|---|
| 0 | GPR24 | 8 | 16 | 6 |
| 1 | GPR20 | 9 | 17 | 13 |
| 2 | -- | - | - | - |
| 3 | -- | - | - | - |
| 4 | -- | - | - | - |
| 5 | GPR28 | 13 | 21 | 7 |
| 6 | -- | - | - | - |
| 7 | -- | - | - | - |

...

Age Array

| | |
|---|---|
| Group0 -> -0111111 | → No Restore |
| Group1 -> 1-111111 | → Restore RTAG 5 to GPR20 |
| Group2 -> -------- | → Restore RTAG 6 to GPR24 |
| Group3 -> -------- | → Restore RTAG 7 to GPR28 |
| Group4 -> -------- | |
| Group5 -> -------- | |
| Group6 -> -------- | |
| Group7 -> -------- | |

FIG. 8L

| LREG | ITAGs Writing | RTAG progression |
|---|---|---|
| GPR0 | NONE | 8 |
| GPR4 | NONE | 9 |
| GPR8 | NONE | 2 |
| GPR12 | NONE | 3 |
| GPR16 | NONE | 4 |
| GPR20 | NONE | 5 |
| GPR24 | NONE | 6 |
| GPR28 | NONE | 7 |

FIG. 8M

SLICE-BASED ALLOCATION HISTORY BUFFER

BACKGROUND

The present disclosure relates to computer processing units (CPUs), and more specifically, to history buffers.

SUMMARY

Aspects of the present disclosure are directed towards a system comprising a computer readable storage medium storing instructions and a processor communicatively coupled to the computer readable storage medium. The processor can further comprise a history buffer communicatively coupled to a working mapper, where the history buffer comprises one or more slices, where respective slices are organized by logical register (LREG) grouping, and where each slice comprises a set of logical register (LREG) groupings, and each LREG grouping comprises multiple entries, with each entry storing information in a pre-completion state. Each slice can further comprise an age array, where the age array is configured to determine a relative age between respective LREG groupings for each slice of the history buffer. The history buffer can further comprise a restore, where the restore is organized by LREG.

Aspects of the present disclosure are directed towards a history buffer. The history buffer can comprise an active communication connection to a working mapper. The history buffer can comprise one or more slices, where respective slices are organized by logical register (LREG) groupings and where each slice comprises a set of LREG groupings, and each LREG grouping comprises multiple entries, with each entry storing information in a pre-completion state. The history buffer can further comprise an age array, where the age array is configured to determine a relative age between respective LREG groupings of each slice of the history buffer. The history buffer can further comprise logical registers (LREGs) to organize at least one restore from the history buffer entry back to the working mapper.

Aspects of the present disclosure are directed towards a method comprising implementing a data processing application by executing computer-readable instructions by a processor comprising a history buffer communicating with a working mapper, where the history buffer comprises one or more slices. Where respective slices are organized by logical register (LREG) grouping, and each slice comprises a set of LREG groupings, with each LREG grouping comprising a set of entries. Respective entries can store information in a pre-completion state. Each slice of the history buffer further comprising an age array, where the age array is configured to determine a relative age between respective LREG groupings. The history buffer can further comprise a restore from the history buffer organized by logical registers (LREG). The method can further comprise presenting an output to a user interface responsive to implementing the data processing application.

BRIEF DESCRIPTION OF THE DRAWINGS

The drawings included in the present application are incorporated into, and form part of, the specification. They illustrate embodiments of the present disclosure and, along with the description, explain the principles of the disclosure. The drawings are only illustrative of certain embodiments and do not limit the disclosure.

FIG. 8A illustrates the subset of the working mapper which tracks LREGs, in accordance with some embodiments of the present disclosure.

FIG. 8B illustrates example instruction updates, in accordance with some embodiments of the present disclosure.

FIG. 8C shows the progression of the working mapper, in accordance with some embodiments of the present disclosure.

FIG. 8D shows the history buffer slice after a first instruction dispatch, in accordance with some embodiments of the present disclosure.

FIG. 8E shows the history buffer slice after the first 8 instructions are dispatched, in accordance with some embodiments of the present disclosure.

FIG. 8F further expands on the history buffer slice after the first 8 instructions are dispatched, in accordance with some embodiments of the present disclosure.

FIG. 8G shows the history buffer slice after all 14 instructions are dispatched, in accordance with some embodiments of the present disclosure.

FIG. 8H illustrates the groupings after complete ITAG=1, in accordance with some embodiments of the present disclosure.

FIG. 8I illustrates flush instruction in ITAG=2, in accordance with some embodiments of the present disclosure.

FIG. 8J illustrates flush restore start, in accordance with some embodiments of the present disclosure.

FIG. 8K illustrates $1^{st}$ cycle of restore, in accordance with some embodiments of the present disclosure.

FIG. 8L illustrates the $2^{nd}$ cycle of restore, in accordance with some embodiments of the present disclosure.

FIG. 8M illustrates the final state, in accordance with some embodiments of the present disclosure.

Figure 1:
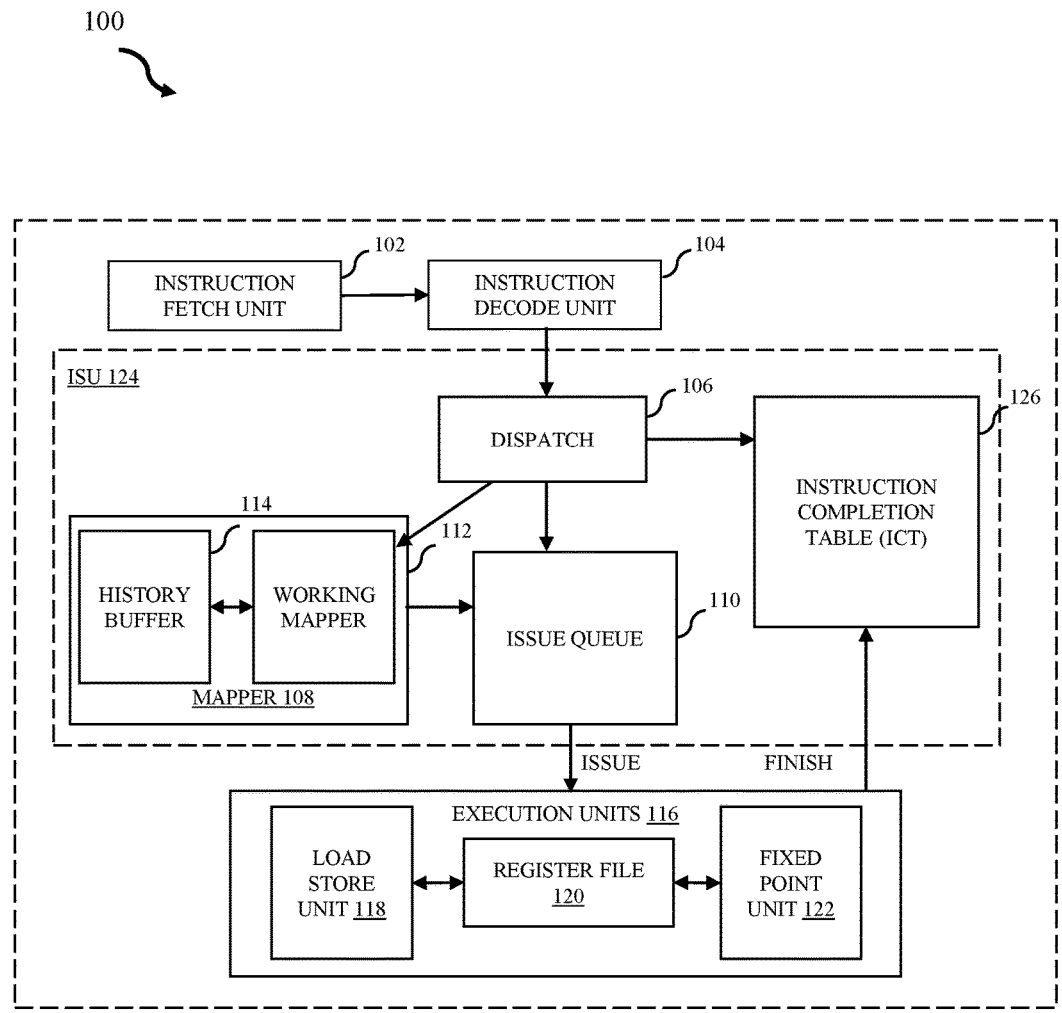
FIG. 1 illustrates a flowchart of an example computer processing unit (CPU) core in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the embodiments described. On the contrary, the intention is to cover all modifications, equivalents, and alternatives falling within the spirit and scope of the present disclosure.

DETAILED DESCRIPTION

Aspects of the present disclosure relate to computer processing units (CPUs), and more specifically, to history buffers in a microprocessor. History buffers are dynamically allocated storage spaces, used to accumulate a history of changes for restoring a state if necessary. More particular aspects of the present disclosure relate to using a slice based allocation history buffer to remove the need for tracking an instructions tag (ITAG) of the previous writes to registers and reducing compares necessary to determine flush restore. Further aspects of the present disclosure relate to completion, restore, and release commands executed in the history buffer and the components required to read data for operands. Although not limited to such applications, an understanding of some embodiments of the present disclosure may be improved given the context of an instruction sequencing unit (ISU).

ISUs are an integrated circuit of various registers, buffers, and other units. In embodiments, a completion command is executed though an instruction sequencing unit. Commands for the processor can be dispatched as groups to a single thread located within a mapper. A mapper converts between a logical register (LREG) (e.g., what the program sees) and a physical register (e.g., what the hardware sees). In embodiments, mapping is required due to out-of-order execution which can have multiple values for a logical register at any given time.

Aspects of the present disclosure can be integrated into, for example, International Business Machines Corporation (IBM) product POWER9 based processors branded under the Power9 family. In embodiments, two threads of RTAG information coupled together comprise a 128-bit super-slice. In some embodiments, two super-slices together with an instruction fetch unit (IFU), an execution unit and an instruction sequencing unit form a single processor core (e.g., a single POWER9 core).

In embodiments, multiple slices comprised in the history buffer align to a given range of logical registers. In embodiments, logical registers determine the history buffer's back-up and restore (e.g., in response to flush) entry, enabling better organization of the restore from the entry back to the working mapper. The following embodiments omit or only briefly describe conventional features of information processing system which are apparent to those skilled in the art. It is assumed that those skilled in the art are familiar with the general architecture of processors, and with processors which operate in order completion fashion.

Referring now to the figures, FIG. 1 illustrates a block diagram of a CPU core 100 in accordance with some embodiments of the present disclosure. Aspects of CPU core 100 relate to a multi-slice processor comprising various registers, buffers, and other units formed by integrated circuitry as well as operands (e.g., RT,RA,RB) as defined by PowerPC architecture. External structures comprised in ISU 124 are further within CPU core 100 to illustrate processing.

ISU 124 is coupled to external units comprising CPU core 100. Components comprised in ISU 124 and CPU core 100 are responsible for fetching and executing instructions stored in memory. In embodiments, instructions are fetched with an instruction fetch unit (IFU) 102 and passed to instruction decode unit (IDU) 104 to decode the instructions. IDU 104 then sends the decoded instructions to ISU 124 for execution. For example, the IFU 102 will travel down an interconnect bus (not pictured) and through a level 1 and level 2 cache to obtain instructions. Instructions may comprise a request to add the register R1+R2 and store in register R3. IFU 102 would then pass the fetched instructions to IDU 104 to decode the instructions to determine the type of instruction, the execution unit, and the operands required for execution. The ISU 124 receives the instructions from IDU 104, obtains either operand data or physical register pointers and routes instruction to the execution unit. In embodiments, ISU 124 further schedules issue to the execution unit once all data for execution is ready. The instruction is not complete until it is finished with execution.

ISU 124 contains dispatch unit 106. Dispatch unit 106 receives decoded instructions from IDU 104 and dispatches instructions to both mapper 108 and issue queue 110. Dispatch unit 106 is further coupled to instruction completion table (ICT) 126. In embodiments, mapper 108 comprises working mapper 112 and history buffer 114.

Mapper 108 manages the mapping of logical registers (LREG) to physical registers (RTAG) unit for ISU 124. Working mapper 112 identifies where the last writer wrote to register file 120 for general logical registers R1 and R2 sources (e.g., GR1, GR2), assigns a physical register (RTAG) for new targets at dispatch time and sends the physical mapping to issue queue 110. Mapper 108 then determines the physical mapping for the target at the same time it is looking up source mappings and passes these together to issue queue 110. The mapper 108 will update the current mapping for GR3 and evict the previous RTAG for GR3 to history buffer 114.

History buffer 114 comprises slices as a way of organizing entries. The last written information from working mapper 112 is saved as an entry in one of the slices of history buffer 114 and designated to handle a logical register such as, for example, logical register GR3, in case the corresponding instruction is flushed and back-up (e.g., restore) to the previous state is necessary. In embodiments, history buffer 114 will save the logical register, the original physical register, the new physical register and the instruction tag (ITAG) of the instruction which evicted the old physical mapping of the logical register from the working mapper when a new register was issued.

Issue queue 110 receives information from dispatch unit 106 on where to execute the instruction and receives the physical mapping for the sources and target from mapper 108. Once the instruction is ready to issue and data from previous sourced instructions are ready, the instruction is executed to the appropriate unit in execution units 116. In embodiments, execution units 116 comprises load/store unit (LSU) 118, register file 120, and fixed point unit (FXU) 122. For example, to add R1+R2 as to write R3, the issue queue 110 executes instructions into FXU 122 where the source operands (e.g., RA and RB) can be read from register file 118 using the physical tag provided by issue queue 110. FXU 122 can then generate the result by adding the values from RA and RB and can then write to register file 120 at the address provided at issue time for the target. FXU 122 can then indicate the instruction is finished and send the notification back to ICT 126. ICT 126 can indicate completion to all blocks.

In embodiments, mapper 108 will receive the completion and compare it against the instruction tag stored in history buffer 114. When the evictor of the entry is completed, history buffer 114 will release the previous physical mapping to a free-list for reuse and release the entry in history buffer 114 as well.

It is noted that FIG. 1 is intended to depict the representative major components of CPU core 100 and instruction sequencing unit 124 in an example processor. In some embodiments, however, individual components can have greater or lesser complexity than as represented in FIG. 1, components other than or in addition to those shown in FIG. 1 can be present, and the number, type, and configuration of such components can vary.

Figure 2:
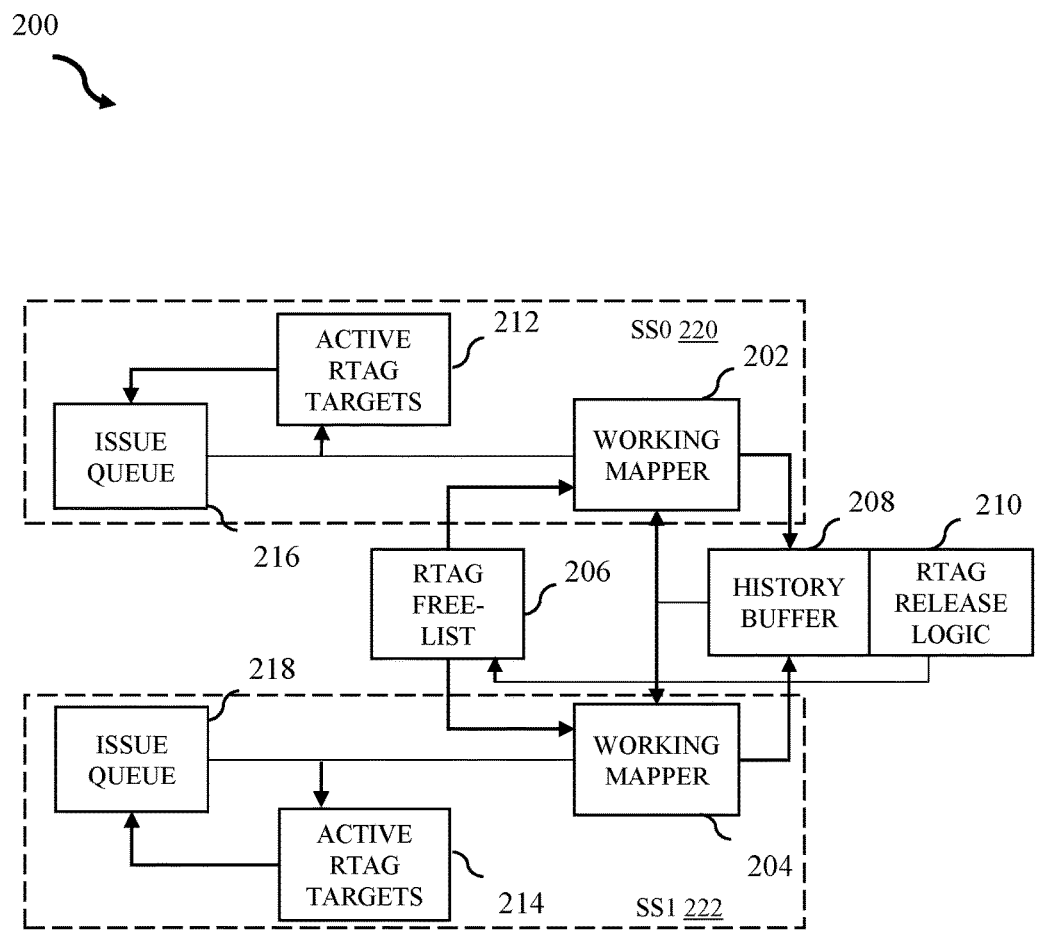
FIG. 2 illustrates an example high-level structure in accordance with some embodiments of the present disclosure.

FIG. 2 illustrates an example high-level structure 200 in accordance with some embodiments of the present disclosure. Aspects of high-level structure 200 relate to a portion of a multi-slice processor within an instruction sequencing unit (ISU) (e.g., ISU 124 of FIG. 1).

High-level structure 200 can comprise n number execution slice 220 and 222. Each execution slice 220 and 222 can have a working mapper 202 and 204. In embodiments, there exist two execution slice 220 and 222, however, the present embodiment is not limited to such. Working mapper 202 and 204 can be, for example, a shared working mapper consistent with working mapper 112 in FIG. 1. Both working mapper 202 and 204 are coupled to various components of high-level structure 200. Register pointer (RTAG) free-list 206 and history buffer 208 are coupled to both working mapper 202 and 204. RTAG free-list 206 provides target register pointers to both working mapper 202 and 204 and history buffer 208 can be configured to store instructions to registers arranged by logic. For example, RTAG free-list 206 provides new physical register pointer (RTAG) to write based on entries not listed as currently mapped. Active register pointer target 212, and issue queue 216 are further coupled to working mapper 202. Active register pointer target 214 and issue queue 218 are further coupled to working mapper 204. In embodiments, issue queue 216 and 218 are not necessarily tied to a specific thread. Both active register pointer target 212 and 214 can be a list comprising processing RTAGs in an ISU (e.g., ISU 124 of FIG. 1), used to validate dependencies to respective issue queue 216 and 218. Issue queue 216 and 218 can be, for example, a shared issue queue consistent with issue queue 110 of FIG. 1. Issue queue 216 and 218 handle specific threads of dispatched units. In embodiments, dispatch determines how to route between slices based on a thread-mode (e.g., single thread, dual thread). Register pointer release logic 210 receives release request from history buffer 208 and manages release interface to RTAG free-list 206. In embodiments, history buffer 208 may release at a rate which is too fast for the RTAG free-list 206 to accept. In such embodiments, release logic 210, can act as a release buffer.

During dispatch time, working mapper 202 and 204 gain a register pointer (RTAG) from the free-list 206. The RTAG free-list 206 can write in new target RTAGs to working mapper 202 and 204. In embodiments, the RTAG free-list 206 can provide one general purpose register (GPR) and one vector scalar register (VSR) RTAG per cycle per dispatch instruction to working mapper 202 and 204. The working mapper 202 and 204 can process the newly targeted dispatched values from RTAG free-list 206 and then store the previously held RTAG content in history buffer 208. Instructions stored in history buffer 208 can be received through a register file. The RTAG free-list 206 can provide a count of available RTAGs to dispatch. In embodiments, the RTAG free-list 206 divides RTAG space based on dispatch instruction and provides one or more counts to dispatch based on available entries. In embodiments, the RTAG free-list 206 can pre-allocate RTAGs into dispatch slices and can provide a count of pre-allocated entries to dispatch by slice.

In embodiments, history buffer 208 comprises a multi-slice history buffer comprising information of previous dispatched targeted data. In embodiments, the history buffer 208 has several entries within the slices holding information related to the previous mappings that have been evicted from the working mapper 202 and 204 and could require restore back to working mapper 202 and 204. In embodiments, the working mapper holds the pointer to the most recent target result data corresponding to a logical register identifier based on LREG allocation from working mapper 202 or 204. For example, to preserve the content of the instructions, content can be forwarded to history buffer 208 and further organized into slices based on content as determined by LREG allocation logic. Content stored in history buffer 208 comprises RTAG information and LREG/evictor ITAG information required for restore.

The content stored in history buffer 208 is determined by LREG allocation logic. Content further comprises instruction tag(s) (ITAG) and result data from corresponding completed instructions. In embodiments, registers (e.g., GPR) may need to be restored using content stored in history buffer 208. History buffer 208 further holds an evictor ITAG, an evictor RTAG, the logical register, and the previously written RTAG. The flush-restore for the history buffer can restore the machine state back to a pre-flush point to ensure execution at the correct location in high-level structure 200.

In embodiments, RTAGs are evicted from working mapper 202 and 204 and the evictor ITAG becomes the ITAG of the instruction which evicted the RTAG. Active RTAG targets 212 and 214 track write-backs using evicted ITAG(s) for dependency purposes only and write back data goes to a register file (e.g., register file 120 of FIG. 1). Removing the write back from the mapper and history buffer enables the removal of the previously written ITAG. The register file is updated by the write-back, however it does not care about flush or completion. Working mapper 202 and 204 and history buffer 208 focus on flush or completion to determine whether to restore to a previous state or release RTAGs to RTAG free-list 206. In embodiments, re-routing write-backs, speeds up operations and reduces lookup instances.

The high-level structure 200 further comprises active RTAG target 212 and 214. In embodiments, the active RTAG target 212 and 214 use logic to indicate a dependency from respective working mapper 202 and 204 is valid to the respective issue queue 216 and 218. Dependencies refer to program statements (e.g., instructions) relating to the data of preceding statements. Targets of active RTAG target 212 and 214 perform different functions at different points of execution throughout high-level structure 200. In embodiments, active RTAG target 212 and 214 snoop new targets assigned at dispatch and will snoop the write-back bus for when these RTAGs have been written. If the RTAG target has been allocated but not-yet written, the data is not ready. Once the write-back for the data (from execution unit) has been seen, the RTAG can be marked ready and thus not create an outstanding dependency. When read, active RTAG target 212 and 214 will check if the source RTAGs (from the mapper) are still outstanding (e.g., not yet seen write back). If they are, a dependency is created. If not, the source is considered ready for issue. Thus dependency determination has been moved outside the working mapper 202 and 204 as well as the history buffer 208.

It is noted that FIG. 2 is intended to depict the representative major components of a high-level structure 200 in an example instruction sequencing unit associated with a multi-slice processor. In some embodiments, however, individual components can have greater or lesser complexity than as represented in FIG. 2, components other than or in addition to those shown in FIG. 2 can be present, and the number, type, and configuration of such components can vary.

Figure 3:
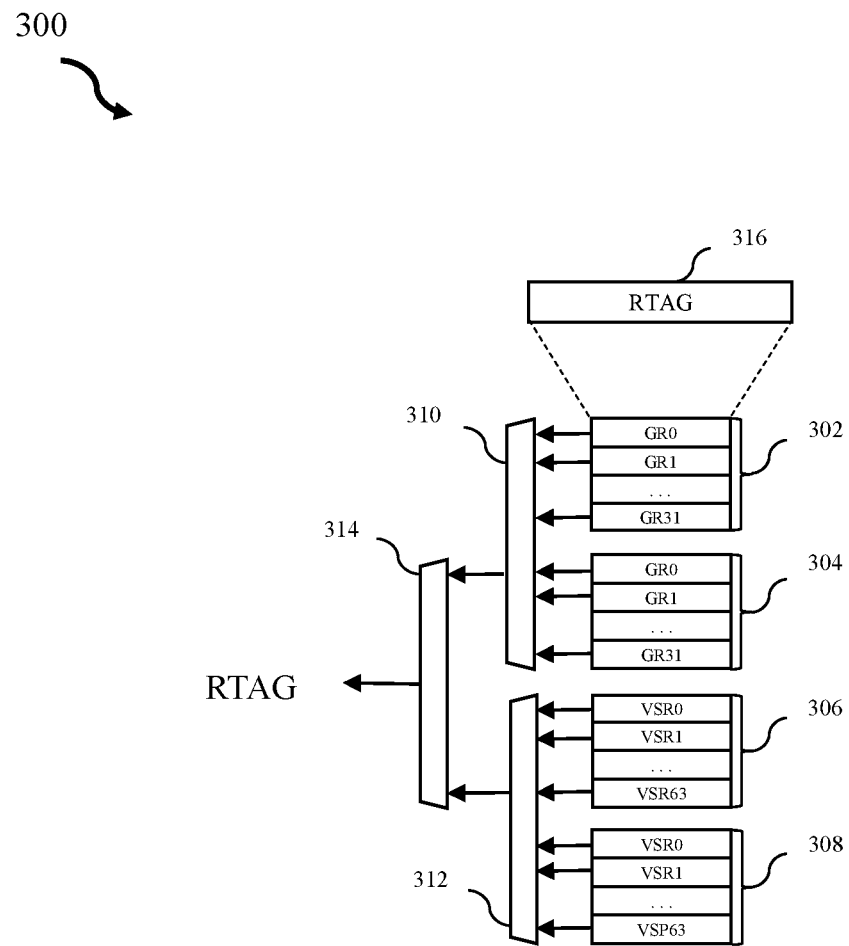
FIG. 3 illustrates an example subsystem of a working mapper in accordance with some embodiments of the present disclosure.

Referring to FIG. 3, FIG. 3 illustrates an example subsystem of a working mapper 300 in accordance with some embodiments of the present disclosure. In embodiments, working mapper 300 is a logical register to register pointer mapper. In embodiments, working mapper 300 can be consistent with working mapper 112 of FIG. 1 and/or working mapper 202 and 204 of FIG. 2. In embodiments, the working mapper 300 can interact with a history buffer (e.g., history buffer 114 of FIG. 1, history buffer 208 of FIG. 2).

In embodiments, working mapper 300 converts logical registers in a program to a physical register. Using a history buffer design of various registers, the working mapper can organize RTAGs written at dispatch time, provided by RTAG free list 206 of FIG. 2 instructions into thread 302 to keep track of dependencies throughout the system. RTAG free-list (e.g., RTAG free-list 206 of FIG. 2) dispatches instructions as groups (e.g., GR1) to a single thread located within a mapper (e.g., mapper 202 and/or 204 of FIG. 2). In embodiments, multiple logical registers comprise threads. In embodiments, RTAGs can additionally be written into thread 304, 306 and 308. Allocation logic uses logical register identifiers to organize dispatched instructions of RTAGs. In various embodiments, the working mapper 300 and the history buffer can comprise one or more threads of register mappings.

At dispatch time, new RTAG targets are written in to working mapper 300 and previous values are evicted from working mapper 300 to the history buffer (e.g., history buffer 114 of FIG. 1, history buffer 208 of FIG. 2). In embodiments, working mapper 300 holds single RTAG values for each of the 32 General Purpose Registers (GPRs) in thread 302 and 304 as well as for each of the 64 Vector Scalar Registers (VSRs) in thread 306 and 308. At issue time, LREGs are used to organize the newly written RTAGs, as provided by the RTAG free-list (e.g., RTAG free-list 206 of FIG. 2) into each thread 302, 304, 306, and 308 and evict old RTAGs. RTAGs are evicted when an instruction is dispatched writing to a logical register. When this happens, the RTAG free-list supplies a new RTAG for the working mapper for the new mapping to the LREG. The older version is evicted and sent to the history buffer. In embodiments, there can be 6 write-ports (e.g., dispatched information blocks) in a cycle between threads. In embodiments, the evicted RTAG can later be restored on flush and released on completion.

In embodiments, muxing structure 310 and 312 each comprise two threads worth of LREG files and mapper information. In embodiments, muxing structure 310 comprises a general-purpose register (GPR) thread 302 and GPR thread 304. In embodiments, muxing structure 306 comprises a vector scalar register (VSR) thread 306 and VSR thread 308. Muxing structure 310 and 312 of LREG to RTAG mapper 300 can comprise two threads of GPR mappings and two threads of VSR mappings used to determine the most recent issued RTAG.

In embodiments, the RTAG free-list (e.g., RTAG free-list 206 of FIG. 2) can act as a pool to service slices in the history buffer used to issue RTAGs in LREG to RTAG working mapper 300. The RTAG free-list is not limited to one list for both slices. Muxing between muxing structure 310 and 312 is complete in muxing structure 314 and the youngest RTAG is sent to the issue queue. The issue queue can receive the RTAG value for valid lookup. In embodiments, the issue queue can be consistent with issue queue 110 of FIG. 1 and/or issue queue 216 and/or 218 of FIG. 2.

It is noted that FIG. 3 is intended to depict the representative major components of an example sub-system of working mapper 300. In some embodiments, however, individual components can have greater or lesser complexity than as represented in FIG. 3, components other than or in addition to those shown in FIG. 3 can be present, and the number, type, and configuration of such components can vary.

Figure 4:
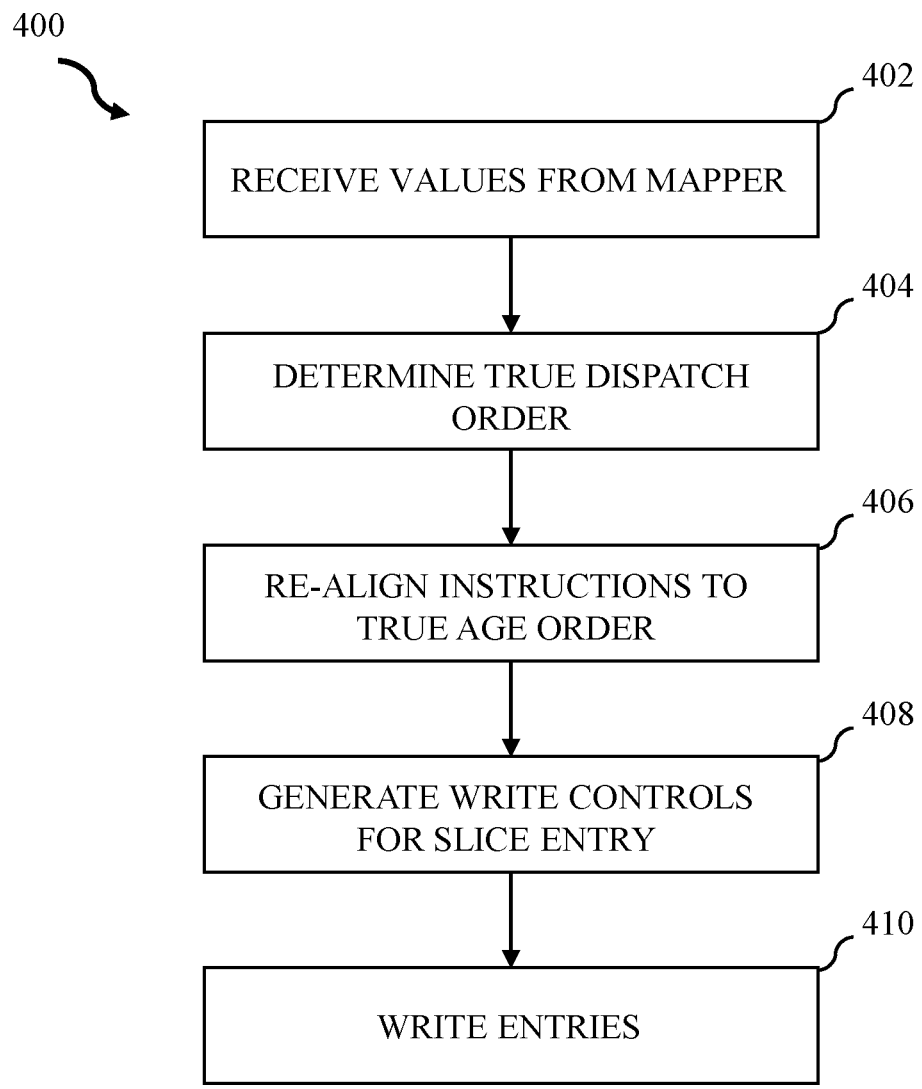
FIG. 4 illustrates a flowchart of an example method of history buffer steering allocation logic in accordance with some embodiments of the present disclosure.

Referring to FIG. 4, FIG. 4 illustrates a flowchart of an example method of history buffer steering allocation logic in accordance with some embodiments of the present disclosure. In various embodiments, method 400 can be implemented by one or more processors and/or a history buffer (e.g., history buffer 208 of FIG. 2). For clarity, the method 400 will be described as being performed by a history buffer, however, the method 400 can likewise be performed by alternative configurations of hardware. In embodiments, the method 400 starts with operation 402.

In operation 402, the history buffer (e.g., history buffer 208 of FIG. 2) can receive ITAG values from dispatch and evicted RTAG information from a working mapper (e.g., working mapper 300 of FIG. 3). An early indication to the history buffer slice, regarding the total count of received information, can be issued to each history buffer slice to allow slice allocation logic to select entries to write.

In operation 404, the history buffer can determine the true dispatch order based on the order of the evictor ITAGs. The history buffer slice logic can receive an indication regarding which of the final results to write from dispatch order. In operation 406, the history buffer can re-align instructions to true age order. Each evicted ITAG and RTAG can be distributed among history buffer slices based on respective LREGs they represent.

In operation 408, the history buffer receives an indication regarding the result to write-in, from previous operations, and further calculates write control to select slice entries. In operation 410, the history buffer writes each newly allocated entry. In embodiments, entry allocations within a history buffer slice are consecutive within a single grouping and all groupings begin at entry 0 (within the grouping) if it is a newly allocated grouping this cycle. For partially written grouping, a new write cycle would write to the next one in consecutive order (e.g., one cycle could write entry 0,1,2 and the next entry write 3,4,5).

It is noted that FIG. 4 is intended to depict the representative major operations of an example method 400. In some embodiments, however, individual operations can have greater or lesser complexity than as represented in FIG. 4, operations other than or in addition to those shown in FIG. 4 can be present, and the number, type, and order of such operations can vary.

Figure 5:
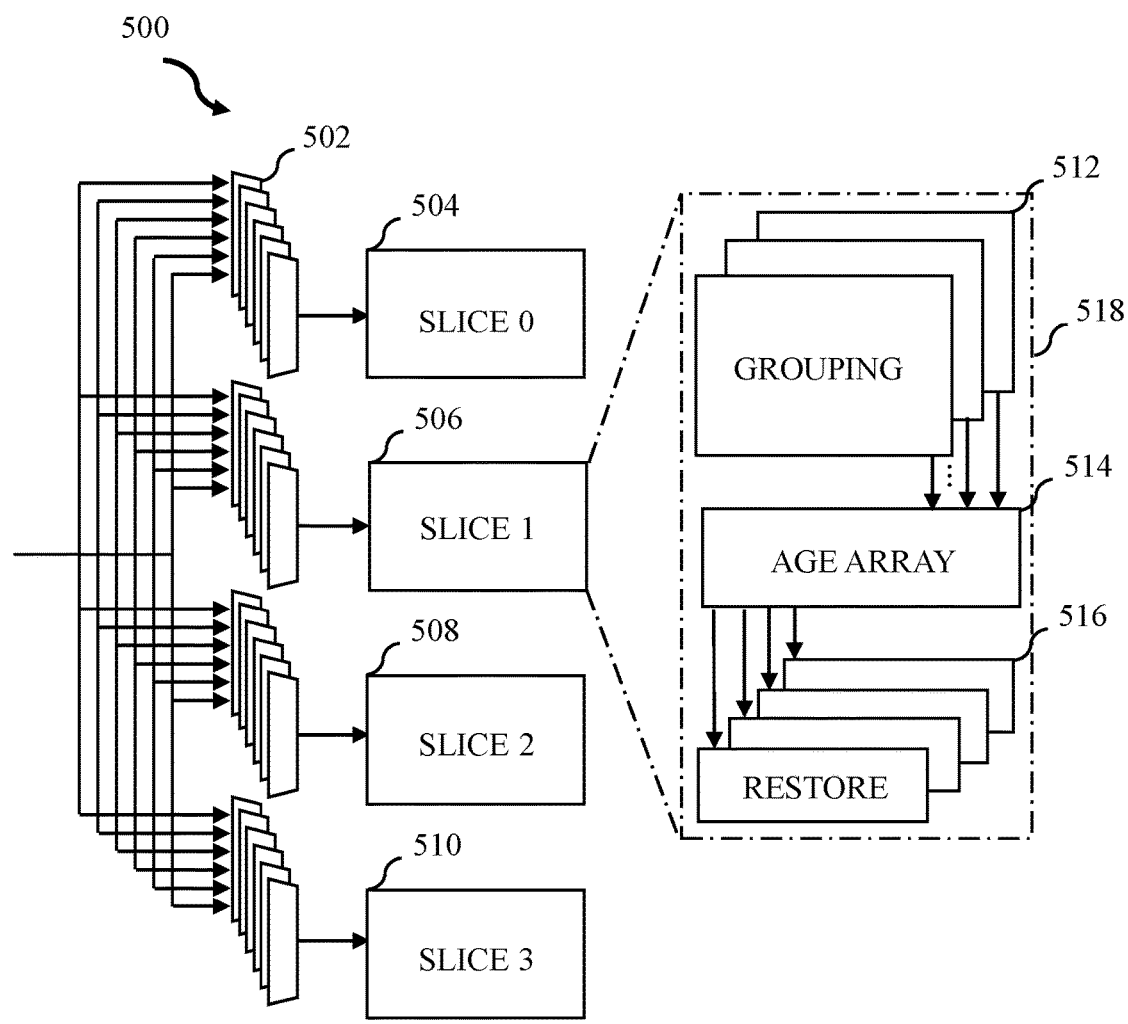
FIG. 5 illustrates an example history buffer system in accordance with some embodiments of the present disclosure.

Referring to FIG. 5, FIG. 5 illustrates an example history buffer 500 system in accordance with some embodiments of the present disclosure. In embodiments, FIG. 5 expands upon the detailed diagram of history buffer 208 of FIG. 2.

The history buffer 500 can be a single unified history buffer that can support a single execution slice (e.g., execution-slice 220 and execution slice 222 of FIG. 2). In embodiments, the history buffer receives steering multiplexes comprising individual write-port(s) 502 from a working mapper (e.g., working mapper 202 of FIG. 2). The history buffer 500 can use a slice based allocation system that can be configured to slice received content into, for example, but not limited to, four slices such as slice 504, slice 506, slice 508, and slice 510. Each slice of history buffer 500 can comprise identical components to slice 506. Slice 506 can comprise a history buffer setup with logic 518. In embodiments, logic 518 is related to flush restore, however, logic 518 is not limited to flush restore. Logic 518 comprises, but is not limited to, grouping 512, age array 514, and restore 516.

In embodiments, the steering multiplexes write-port 502 can comprise requestors, instructions, and entries. Using the LREG history buffer steering allocation logic (e.g., the method 400 of FIG. 4), steering multiplexes write-ports 502 can be grouped together and separated into slices. In embodiments, a write-port 502 contains mapper information for dispatched instructions and tracking dependencies. At dispatch time in a working mapper (e.g., working mapper 300 of FIG. 3), new targets determined by dispatched instructions are written into write-port 502 and divided among four slices (e.g., slice 504, slice 506, slice 508, and slice 510). In embodiments, there can be but not limited to, 6 write ports 502 because all the dispatches could be to the same LREG range and thus target the same slice of the history buffer. In embodiments, each write port 502 can represent an executed cycle and 1 write port is required per dispatch. In embodiments, there are 4 restore ports per slice (or LREG range) for 4 restores from the slice possible per cycle. This is not fixed based on design, but is determined by how many restore parts the give design wants to support. Restore and dispatch are independent. For example, a set of the previous six written write-ports (e.g., X0_dispatch, X1_dispatch, XA_dispatch, X2_dispatch, X3_dispatch, XB_dispatch) used to restore the mapper can be replaced with six new dispatched instructions and can be split to slices.

In embodiments, the history buffer 500 is not associated with write-backs and each history buffer slice can contain all mapper history associated with a LREG range assigned to the slice.

In embodiments, each slice 504, 506, 508, and 510 has a range of LREGs which can be contained in the slice. In embodiments, each slice 504, 506, 508, and 510 comprises but not limited to, eight sets of groupings 512. In embodiments, logic 518 comprises a network of logic gates and operands.

Each grouping 512 in history buffer is in strict age order as determined by which entry it is within the grouping. In embodiments, grouping logic uses LREGs (e.g., LREG(0: 4)) to determine which register type is held in each entry and location within the grouping to establish the relative age between request entries. In embodiments, all dispatches within a given LREG range will occupy the same grouping until all entries within the grouping are used.

Age array 514 can determine the relative age difference between sets of individual grouping 512. In embodiments, the age array 514 contains, but not limited to, 4 sets of age compares per slice. For example, age array 514 can contain a set of age compares for each restore 516 output. In embodiments, the number of sets of age compares per slice is linked to the number of register ports per slice (e.g., 1 set of age compare per restore port). In embodiments, recovery state machine 516 is pipelined to an interface and the output feeds back to the working mapper (e.g., working mapper 202 of FIG. 2) to restore the state.

It is noted that FIG. 5 is intended to depict the representative major components of an example system 500. In some embodiments, however, individual components can have greater or lesser complexity than as represented in FIG. 5, systems other than or in addition to those shown in FIG. 5 can be present, and the number, type, and configuration of such components can vary.

Figure 6:
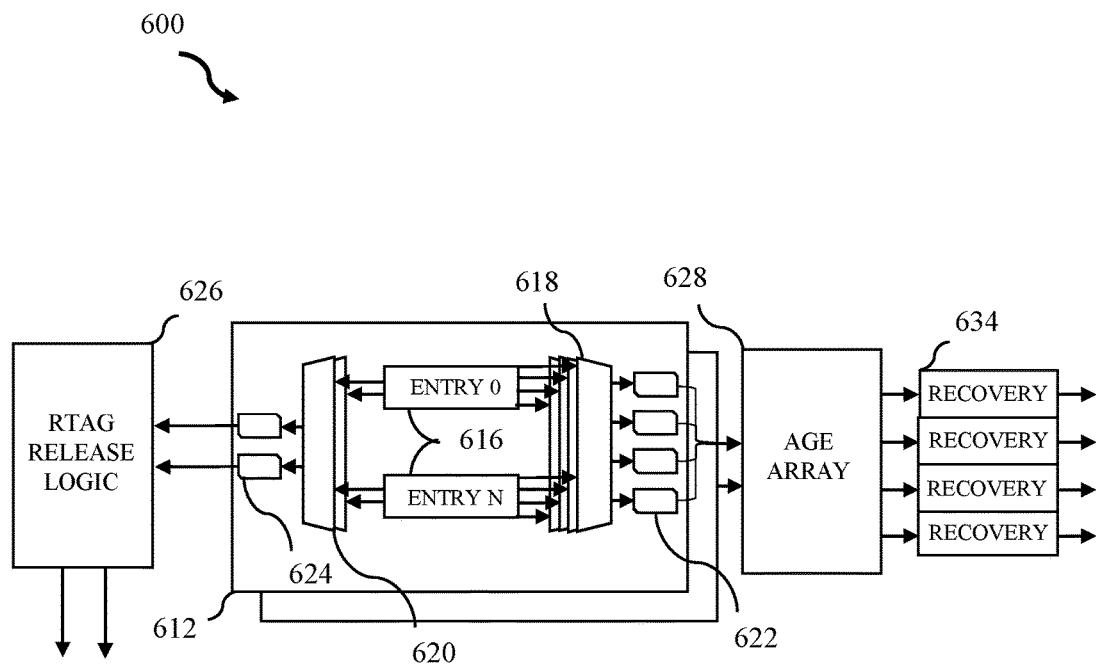
FIG. 6 illustrates an example history buffer slice in accordance with some embodiments of the present disclosure.

Referring to FIG. 6, FIG. 6 illustrates an example history buffer slice 600 system in accordance with some embodiments of the present disclosure. In embodiments, FIG. 6 comprises a more detailed diagram of logic 518 in FIG. 5.

Each grouping 612 in the history buffer is in strict age order as determined by grouping logic. In embodiments, grouping logic uses entries within groupings to determine which register type is held in each entry and to establish the relative age between request entries. In embodiments, all dispatches within a given LREG range will occupy the same grouping until all entries are used.

Each set of groupings 612 can further comprise eight sets of entry 616. In embodiments, history buffer slice entry 616 originates from a working mapper (e.g., working mapper 202 of FIG. 2) and can be written with history buffer steering allocation logic (e.g., history buffer steering allocation method 400 of FIG. 4). In embodiments, history buffer slice entry 616 comprises a network of logic gates and operands to determine the function of the received entry.

In some embodiments, there exist four restore multiplex write-ports 618 responsible for identifying a restore request in entry 616 for flush restore per grouping 612. In embodiments, restore multiplex write-port 618 selects the first issued entry 616 request to flush restore. Within grouping 612, the first restore request (e.g., priority mux where lower entry number has higher priority) will release their evictor RTAG. The four restore multiplex write-ports 618 will take the four flush requests 622, and pass them to the age array 628.

In embodiments, there exist two release logic multiplex write-ports 620 and two release requests 624. In embodiments, release logic multiplex write-port 620 is responsible for picking a first and last release request 624. Release logic multiplex write-port 620 can then pass the selected release requests 624 to the RTAG release logic 626. All entries from the release logic multiplex write-port 620 can send one request which goes to, but not limited to, two release requests from entry 616 per cycle. The logic ensures the same request is not selected on both release request. The entries selected by logic release in this cycle make one request that goes to both release request.

In embodiments, the history buffer grouping logic (e.g., history buffer grouping logic 518 of FIG. 5) can feed through additional signals (e.g., latch, flush, completion, restore range) however, once allocated, grouping 612 is active until all entries have been released.

In embodiments, RTAG release logic 626 is used to handle RTAG releases per cycle. In embodiments, there exist two release requests 624 used to operate the RTAG release logic 626, however, RTAG release logic 626 can be associated with more or fewer release requests 624 according to various embodiments. In embodiments, RTAG release logic 626 can accept n (e.g., any positive integer) request from the history buffer grouping 612. Upon seeing a request from the level one history buffer to release a RTAG, the RTAG release logic 626 determines where the requesting value is located and this releases the RTAG to the RTAG free-list. If the requested held entry cannot be restored later, the RTAG is sent to a RTAG free-list (e.g., RTAG free-list 204 of FIG. 2) to be released for new allocation. If indications of restore occur in response to flush instructions, in embodiments, the RTAG release logic 626 holds, for each release request 624, its valid bit, the LREG used to determine the entry (e.g., LREG (0:6)), and the RTAG evicted from the working mapper by instruction (e.g., RTAG(0:?)).

In embodiments, age array 628 determines the relative age difference between individual sets of grouping 612 when they are provided multiplexing for flush restore. In embodiments, age array 628 logic holds an array of n×n, where n is the number of groupings. In embodiments, 8 groupings are present and there exists a 64-bit age array 628. Age array 628 logic can track the relative age between groupings and determine the oldest suitable for release flush restore. At allocation time (e.g., time to determine which grouping is oldest) a bit will be set for each older grouping. In embodiments, all dispatches within a given LREG range will occupy the same grouping until all entries are used. The age array 628 determines the oldest grouping and issues pipeline restore to release grouping values to recovery state machine 634. At release time for any grouping, all entries will clear the bit to indicate this group is no longer older. In embodiments, for all request from the level one history buffer, all individual sets of groupings 612 can check against each other to determine a winner.

In embodiments, if the issued instruction has not been executed and back up to the previous state is required, the flush logic will broadcast the instruction tag (ITAG) of the oldest instruction which must be flushed. In embodiments, backing up the working mapper creates an entry based on logical registers. The working mapper can compare this ITAG against the evictor tag of all valid history buffer entries. In embodiments, all entries which flush the evictor can indicate restore is required. The history buffer can then restore entries based on logical registers.

In each cycle, all entries which flushed the evictor for a given logical register can attempt to send the restore. Within a grouping, age can be determined by physical location. Between groupings, age can be determined using an age array which tracks relative age between groupings. In embodiments, if multiple entries attempt to restore the same logical register, only the oldest one (e.g., determined by grouping age and then age-array) will pass the request to the recovery interface. This entry will then release the new register tag (RTAG) value to the free-list. All other entries which try to restore the same logical register will only release the new register tag (RTAG) to the free-list.

It is noted that FIG. 6 is intended to depict the representative major components of an example system 600. In some embodiments, however, individual components can have greater or lesser complexity than as represented in FIG. 6, systems other than or in addition to those shown in FIG. 6 can be present, and the number, type, and configuration of such components can vary.

Figure 7:
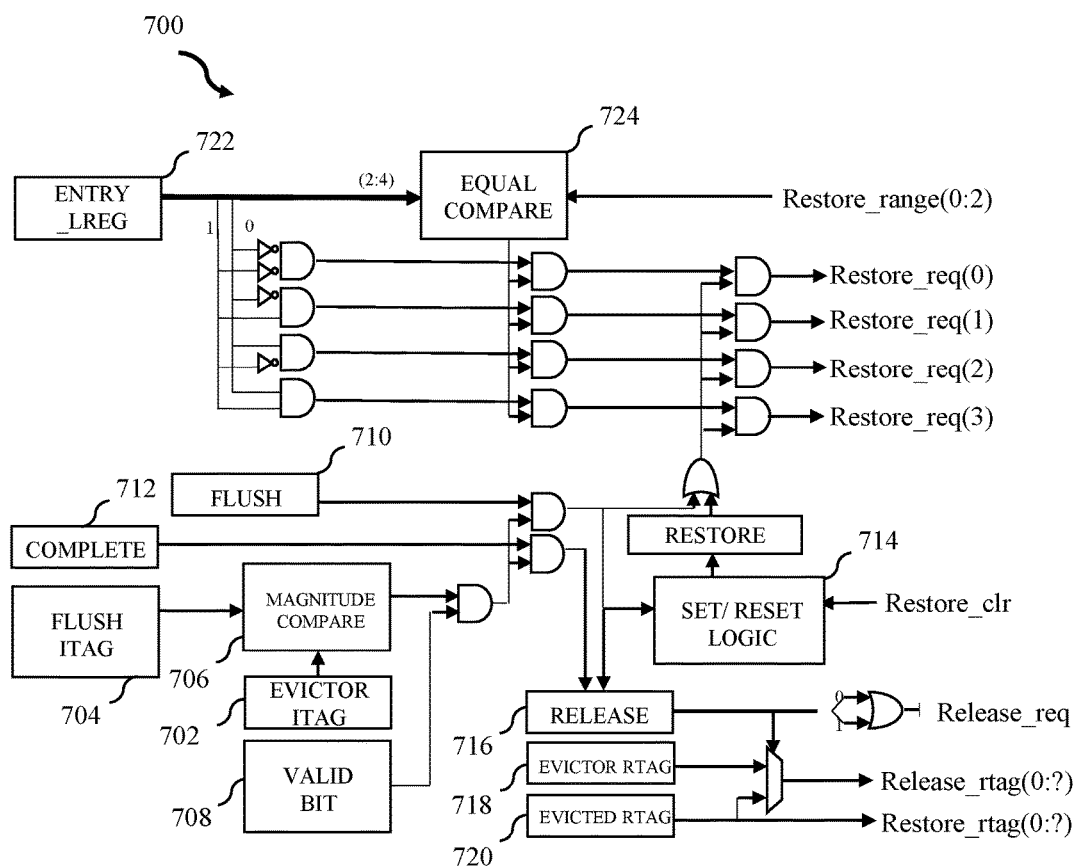
FIG. 7 illustrates an example history buffer slice entry in accordance with some embodiments of the present disclosure.

Referring to FIG. 7, FIG. 7 illustrates an example history buffer slice entry 700 in accordance with some embodiments of the present disclosure. In embodiments, FIG. 7 comprises a more detailed diagram of entry 616 in FIG. 6.

History buffer slice entry 700 includes an indication that valid content (e.g., Entry_v) exists. FIG. 7 further shows logic contained within a single entry. Each entry contains entry_v, evictor ITAG (e.g., evictor_itag) and the flush and completion compares. In embodiments, there is a single flush and completion ITAG which further goes to all entries of each slice. In embodiments, the flush and completion ITAGs are pre-muxed external to the slices and the flush ITAG along with an indicator if it is a flush or complete is sent. There exists a single magnitude compare (per entry) which is further processed based on whether it is marked complete or flush. The evictor ITAG is passed to the magnitude compare to determine a hit. In embodiments, there exists one evictor ITAGs (e.g., Evictor_itag(0:8)) 702 per entry and is used for flush and completion compares from external structures. Single flush ITAG 704 (e.g., Flush_itag(0:8)) is passed to a magnitude compare unit 706 and compared to evictor ITAG 702. The magnitude compare unit 706 determines whether flush ITAG 704 is older than the evictor ITAG 702. In embodiments, the magnitude compare unit 706 further determines whether the flush ITAG 704 is older than an ITAG from the last instruction to update the state of the transaction. In this example, the result of the magnitude comparison unit between flush ITAG 704 and evictor ITAG 702 is processed through an AND logic gate for evictor ITAG 702 (e.g., Evictor_itag_v) to indicate if a release or restore is required. The oldest ITAG is then passed through two separate AND gates coupled with a flush request 710 and a completion request 712.

The combination of flush request 710 and the evictor ITAG 702 can create an indication to set and reset logic 714 of a restore clear. Further it can create a release indication (e.g., Release:reqd(0:1)) 716 that can indicate that an RTAG needs to be released due to flush. The indication can state an RTAG needs to be released due to completion. In embodiments, written evictor RTAGs (e.g., Evictor_rtag(0:?)) 718 are used for RTAG release on flush. Evicted RTAGs (e.g., RTAG(0:?)) 720 from a working mapper (e.g., working mapper 202 of FIG. 2) can be restored on flush and can be released on complete. The result of the flush or complete compare feeds into the SET/RESET logic to set the restore bit. The restore_clr is an input to the entry Simultaneously as flush ITAG 704 is flushed, LREGs used to determine which register type is held in subset of entry_LREG entry 722 (e.g., lreg(0:4)) is sent through four series of logic gates representing each slice as well as separately sent to an equal compare unit 724. The slice control logic will indicate which restore range is to be operated on. This ensures requests sent from the entries match the proper LREG. Equal compare unit 724 compares the LREG range to LREGs held in the entry (entry_LREG). In embodiments, the restore range indicated is to narrow down to a range of 4 possible LREGs. The equal compare along with the other gates off the entry_lreg determine which restore_req to turn on. Each slice is further restored, set by a flush compare and cleared on flush restore or an indication of an entry not oldest in the restore request.

History buffer slice entry 700 operates upon requests to either restore or release RTAGs in high-level structure 200. It is noted that FIG. 7 is intended to depict the representative major components of an example system 700. In some embodiments, however, individual components can have greater or lesser complexity than as represented in FIG. 7, components other than or in addition to those shown in FIG. 7 can be present, and the number, type, and configuration of such components can vary.

FIGS. 8A-8M illustrate tables associated with example instructions in entry release and restore, in accordance with some embodiments of the present disclosure. FIGS. 8A-8M are intended to further expand upon the interaction between a working mapper and a history buffer and their function with ITAGs of the last writer, LREGs, and RTAGs as they are processed through a CPU core (e.g., CPU core 100 of FIG. 1). FIG. 8A-8M are intended to show the minimum detail necessary for example instruction tables, however, the present disclosure is not limited to the details illustrated in FIGS. 8A-8M. In embodiments, there exists a reduction in compares as well as not requiring both the evictor ITAG and the previous writer ITAG for determine when the entry should be restored. Using placement within groupings and the age array between groupings will determine what entry to restore versus just releasing the RTAG. FIGS. 8A-8M can be performed by, for example, high-level structure 200 of FIG. 2, history buffer slice 600 of FIG. 6, or a different configuration of hardware.

FIGS. 8A-8B comprise example instruction tables o. FIG. 8A comprises LREGs and their corresponding original physical mapping RTAGs. FIG. 8B comprises ITAGs, written registers (e.g., LREG WRT) and new assigned RTAGs.

FIG. 8A comprises a subset of an example working mapper responsible for tracking LREGs and their corresponding original physical mapping RTAGs. In embodiments, tracked LREGs (e.g., GPR0-GPR7) can correspond to the general registers (e.g., GR0) of thread 302 in FIG. 3. In embodiments LREGs GPR0-GPR7 relate to the original physical mapping (RTAG) for the history buffer grouping of the first slice groups that write to, for example, GPR0,4,8, 12,16,20,24,28.

In embodiments, each grouping holds eight entries and there exist 14 instructions flowing through (e.g., ITAG) the mapper. Each instruction writes to this subset of registers and thus all route to the same slice of the history buffer. The 14 instructions fit into 2 groupings and the age array assumes there are 8 groupings within a slice. In this example, the slice has 4 restore paths which means 4 ports into the age array to allow for 4 restores per cycle.

FIG. 8B illustrates example instruction updates and shows which of the 14 instruction tags are written to. In embodiments, FIG. 8B further illustrates writing the register and updating the mapper to which of the new physical mapping (RTAG) will be used.

FIG. 8C shows the progression of the example working mapper. In embodiments, instructions are dispatched through FIGS. 8A and 8B. FIG. 8C shows the working mapper as the example set of instructions is dispatched. In embodiments, when ITAG=0 is dispatched, the mapper evicts RTAG=0 from GPR0 and replaces it with RTAG=8. When ITAG=2 is dispatched, the mapper evicts RTAG=8 from GPR0 and replaces it with RTAG=10. When ITAG=7 is dispatched, the mapper evicts RTAG=10 from GPR0 and replaces it with RTAG=15. Lastly, when ITAG=10 is dispatched, the mapper evicts RTAG=15 from GPR0 and replaces it with RTAG=18. As a result, GPR0 is written to by ITAG=0, 2, 7, 10. In embodiments, other LREGs behave similar as illustrated by FIG. 8C.

FIG. 8D shows the example history buffer slice after a first instruction dispatch. In embodiments, there exist two groupings (e.g., grouping0, grouping1). Grouping® becomes allocated when no groupings come in. The age array is updated to indicate all other groupings are older than grouping0. Entry0 of grouping0 is written with LREG=GPR0, Evictor ITAG=0, Evictor RTAG=8 and RTAG=0. In embodiments, grouping0 and grouping 1 can be represented as individual groupings of groupings 612 of FIG. 6.

FIG. 8E shows the example history buffer slice after the first 8 instructions are dispatched. In embodiments, grouping0 is filled up with the next 7 instructions and entry2 is evicting what ITAG=0 had written.

FIG. 8F further expands on the example history buffer slice after the first 8 instructions are dispatched. In embodiments, the $9^{th}$ instruction (e.g., ITAG=8) is written into entry0 of grouping1 which cause an update in the age array. The age array updates by now indicating all groups older than grouping1 and clearing the grouping1 bit in grouping0 age vector so that grouping0 now sees grouping1 as younger.

FIG. 8G shows the example history buffer slice after all 14 instructions are dispatched. Grouping0 and grouping1 comprise all 14 dispatched instructions. In embodiments, FIG. 8G is not limited to 14 dispatched instructions.

FIG. 8H illustrates the example groupings after complete ITAG=1. FIG. 8H show the update after completion of the first 2 instructions. The evictor ITAG is used to further detect between entry0 and entry 1 as to release from the first grouping. In doing so, the original RTAGs 0 and 1 will release to the free-list and the first 2 entries of grouping0 become invalid. In embodiments, the newly invalid grouping cannot allocate until the entire grouping is released.

FIG. 8I illustrates example flush instruction in ITAG=2. FIG. 8I compares against the evictor ITAG and measures against all remaining entries to verify age. In doing so, all entries indicate a restore is required.

FIG. 8J illustrates an example flush restore start. Slice restore logic indicates a first restore cycle to send requests for a first group (e.g., GPR0,4,8,12) for the 4 restore ports available to this slice. Entry 2,3,4 for grouping 0 send requests on restore ports 0, 2 and 3 (GPR0,8,12). Entry 6 and 7 on grouping 0 detect they are not the oldest request within the group, and release the evictor RTAG to the free-list (14,15). Entry 2,3,4 in grouping1 then sends requests on restore ports 0,1,3 as they are the oldest within the grouping.

FIG. 8K illustrates a $1^{st}$ cycle of an example restore. Port 1 of the age array sees a request from grouping0 entry2 and grouping1 entry2. The age array sees grouping0 as older and so the restore request from grouping0 goes to the restore pipe and the grouping1 request is rejected and thus grouping 1 releases the evictor RTAG (18) and releases the entry. RTAG=18, 20 are released from grouping1 due to age array reject from the older request made (from grouping0).

FIG. 8L illustrates the $2^{nd}$ cycle of the example restore. The selection moves on to GPR 16, 20, 24, 28. Grouping0 makes request on port 1 for GPR20(entry5). Grouping1 further makes request on port 1 for GPR20(entry1), port 2 for GPR24(entry0) and port 3 for GPR28(entry5). As a result, entry1 of grouping1 gets request rejected due to being younger than the request from grouping0, and releases the evictor RTAG (17). For all flushed entries, the evictor RTAG was released to the free-list and for all completed entries, the previous RTAG was released to the free-list.

FIG. 8M illustrates an example final state. After the flush, all entries in the history buffer are released due to all dispatched instructions being either completed, flushed or restored.

It is noted that FIGS. 8A-8M are intended to depict the representative major components of example instructions in entry release and restore. In some embodiments, however, individual components can have greater or lesser complexity than as represented in FIGS. 8A-8M, components other than or in addition to those shown in FIGS. 8A-8M can be present, and the number, type, and configuration of such components can vary.

Figure 9:
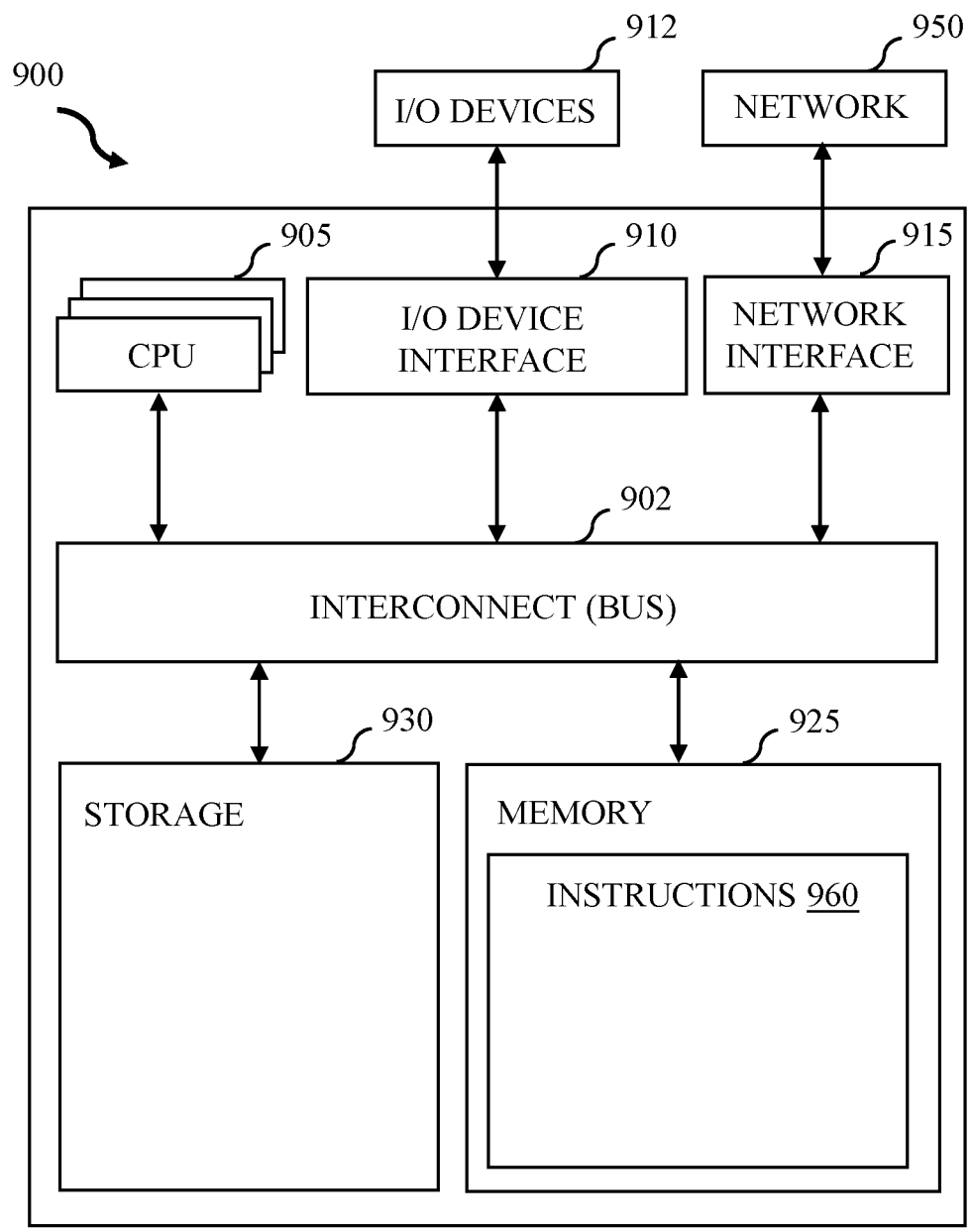
FIG. 9 illustrates a block diagram of a computer system, in accordance with some embodiments of the present disclosure.

FIG. 9 illustrates a block diagram of a computer system 900, in accordance with some embodiments of the present disclosure.

The computer system 900 can include a memory 925, storage 930, an interconnect (e.g., BUS) 902, one or more CPUs 905 (also referred to as processors 905 herein), an I/O device interface 910, I/O devices 912, and a network interface 915.

Each CPU 905 retrieves and executes programming instructions stored in the memory 925 or storage 930. In embodiments, CPU 905 can comprise CPU core 101 of FIG. 1. The interconnect 902 is used to move data, such as programming instructions, between the CPUs 905, I/O device interface 910, storage 930, network interface 915, and memory 925. The interconnect 902 can be implemented using one or more busses. The CPUs 905 can be a single CPU, multiple CPUs, or a single CPU having multiple processing cores in various embodiments. In some embodiments, a CPU 905 can be a digital signal processor (DSP). Memory 925 is generally included to be representative of a random-access memory (e.g., static random access memory (SRAM), dynamic random access memory (DRAM), or Flash).

The storage 930 is generally included to be representative of a non-volatile memory, such as a hard disk drive, solid state device (SSD), removable memory cards, optical storage, or flash memory devices. In an alternative embodiment, the storage 930 can be replaced by storage area-network (SAN) devices, the cloud, or other devices connected to the computer system 900 via the I/O devices interface 910 or a network 950 via the network interface 915.

In some embodiments, the memory 925 stores instructions 960. However, in various embodiments, the instructions 960, are stored partially in memory 925 and partially in storage 930, or they are stored entirely in memory 925 or entirely in storage 930, or they are accessed over a network 950 via the network interface 915.

In various embodiments, the I/O devices 912 can include an interface capable of presenting information and receiving input. For example, I/O devices 012 can present information to a user interacting with computer system 900 and receive input from a user.

Computer system 900 is connected to the network 950 via the network interface 915.

In embodiments, computer system 900 can be used to, for example, implement a data processing application by executing instructions 960 using a CPU 905. In some embodiments, the CPU 905 contains, in whole or in part, aspects previously discussed with respect to FIGS. 1-8M. In some embodiments, computer system 900 can present an output as a result of executing instructions 960 by CPU 905 to a display interface (e.g., I/O devices 912).

Embodiments of the present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present disclosure.

Aspects of the present disclosure are described herein regarding flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or subset of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 960 of FIG. 9) may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A system comprising:
a computer readable storage medium storing instructions;
a processor communicatively coupled to the computer readable storage medium, the processor comprising:
a history buffer communicatively coupled to a working mapper, wherein the history buffer comprises two or more slices;
wherein respective slices are organized by logical register (LREG) grouping, wherein each slice comprises a set of LREG groupings, wherein each LREG grouping comprising a plurality of entries, each entry storing information in a pre-completion state;
wherein each slice of the history buffer comprises an age array, wherein the age array is configured to determine a relative age between respective LREG groupings for each slice of the history buffer; and
wherein the history buffer further comprises a restore, wherein the restore is organized by LREG.

2. The system according to claim 1, wherein the plurality of entries are based on a logical register (LREG) associated with a back-up process in the working mapper.

3. The system according to claim 1, wherein respective entries are allocated in age-order.

4. The system according to claim 1, wherein respective slices further comprise one or more restore ports, wherein each restore port is associated with a single restore interface.

5. The system according to claim 1, wherein respective entries comprise an indication if the respective entries need to restore to a register pointer (RTAG) or release to the RTAG.

6. The system according to claim 1, wherein the age array is further configuring to perform multiplexing operations between LREG groupings stored in respective slices.

7. The system according to claim 1, wherein the history buffer does not comprise data for the working mapper, wherein write-backs of data in the history buffer do not exist.

8. A history buffer comprising:
an active communication connection to a working mapper;
two or more slices, wherein respective slices are organized by logical register (LREG) grouping, wherein each slice comprises a set of LREG groupings, wherein each LREG grouping comprising a plurality of entries, each entry storing information in a pre-completion state;
wherein each slice of the history buffer comprises an age array, wherein the age array is configured to determine a relative age between respective LREG groupings for each slice of the history buffer; and
at least one restore, wherein respective restores are organized by LREG.

9. The history buffer according to claim 8, wherein the plurality of entries are based on a logical register (LREG) associated with a back-up process in the working mapper.

10. The history buffer according to claim 8, wherein respective LREG groupings are organized in sequential order based on age.

11. The history buffer according to claim 8, wherein a respective slice of the history buffer comprises one or more restore ports, wherein each restore port is associated with a single restore interface.

12. The history buffer according to claim 8, wherein respective entries comprise an indication if the respective entries need to restore to a register pointer (RTAG) or release to the RTAG.

13. The history buffer according to claim 8, wherein the age array is further configured to perform multiplexing operations between LREG groupings stored in respective slices of the history buffer.

14. The history buffer according to claim 1, wherein the history buffer does not comprise data for the working mapper, wherein write-backs of data in the history buffer do not exist.

15. A method comprising:
implementing a data processing application by executing a set of computer readable instructions by a processor, the processor comprising a history buffer communicating with a working mapper;
- wherein the history buffer comprises two or more slices, wherein respective slices are organized by logical register (LREG) grouping, each slice comprising a set of LREG groupings, each LREG grouping comprising a plurality of entries, each entry storing information in a pre-completion state;
- wherein each slice of the history buffer comprises an age array, wherein the age array is configured to determine a relative age between respective LREG groupings for each slice of the history buffer; and
- wherein the history buffer further comprises at least one restore, wherein respective restores are organized by LREG; and presenting an output to a user interface in response to implementing the data processing application.

16. The method according to claim 15, wherein the plurality of entries are based on a logical register (LREG) associated with a back-up process in the working mapper.

17. The method according to claim 15, wherein respective slices of the two or more slices comprise one or more threads of mapper information.

18. The method according to claim 15, wherein respective LREG groupings are organized in sequential order based on age; and
- wherein each slice of the history buffer further comprises one or more restore ports, wherein each restore port is associated with at least one recovery state machine.

19. The method according to claim 15, wherein respective entries of the plurality of entries comprise an indication if the respective entries need to restore to a register pointer (RTAG) or release to the RTAG; and
- wherein the age array is further configuring to perform multiplexing operations between LREG groupings stored in respective slices.

20. The method according to claim 15, wherein the history buffer does not comprise data for the working mapper, wherein write backs of data in the history buffer do not exist.

* * * * *